(12) United States Patent
Hocquet et al.

(10) Patent No.: US 8,061,448 B2  
(45) Date of Patent: Nov. 22, 2011

(54) HYDRAULIC BRAKING DEVICE FOR TURBINE, TURBINE EQUIPPED WITH SUCH A DEVICE AND DRILLING EQUIPMENT COMPRISING SUCH A TURBINE

(75) Inventors: Philippe Hocquet, Vanves (FR); Huy-Van Nguyen, Antony (FR); Andrew Parry, Bourg la Reine (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 625 days.

(21) Appl. No.: 10/540,236

(22) PCT Filed: Oct. 30, 2003

(86) PCT No.: PCT/EP03/12069  
§ 371 (c)(1), (2), (4) Date: Oct. 17, 2005

(87) PCT Pub. No.: WO2004/059185  
PCT Pub. Date: Jul. 15, 2004

(65) Prior Publication Data  
US 2006/0159548 A1    Jul. 20, 2006

(30) Foreign Application Priority Data  
Dec. 31, 2002   (FR) .................................... 02 16920

(51) Int. Cl.  
     *E21B 4/02*      (2006.01)

(52) U.S. Cl. ........................ 175/107; 415/123; 188/290

(58) Field of Classification Search ................... 175/107; 188/290, 291, 292, 293, 296; 415/123; 60/435, 60/442  
See application file for complete search history.

(56) References Cited

U.S. PATENT DOCUMENTS

| | | | |
|---|---|---|---|
| 1,781,437 A | | 11/1930 | Chisholm |
| 2,512,438 A | * | 6/1950 | Ranxi ............................ 415/49 |
| 2,952,440 A | * | 9/1960 | Tiraspolsky et al. ............. 415/9 |
| 3,168,939 A | | 2/1965 | Haber |
| 3,547,231 A | * | 12/1970 | Braun ........................... 188/296 |
| 3,599,906 A | | 8/1971 | Reinemuth |
| 3,728,040 A | | 4/1973 | Ioannesian et al. |
| 3,876,350 A | * | 4/1975 | Warder ......................... 418/211 |

(Continued)

FOREIGN PATENT DOCUMENTS  
FR      1009991     6/1952

OTHER PUBLICATIONS  
Patent abstracts of Japan, Jun. 4, 2002, TCM Corp.

*Primary Examiner* — William P Neuder  
*Assistant Examiner* — Robert E Fuller  
(74) *Attorney, Agent, or Firm* — Jianguang Du

(57) ABSTRACT

The hydraulic braking device (10) to be installed in a turbine (2) provided with a turbine shaft (4) comprising at least one body (12) connected to the said turbine shaft (4).  
When the said hydraulic braking device (10) is immersed in a fluid medium, axial rotation of the turbine shaft (4) about its axis causes a movement of the said at least one body (12) with respect to the said fluid medium, this movement generating a resisting torque (T) related to the rotation speed of the turbine shaft (4) through a non-linear relation.

16 Claims, 2 Drawing Sheets

U.S. PATENT DOCUMENTS

| | | | |
|---|---|---|---|
| 3,880,547 A * | 4/1975 | Hagen | 60/791 |
| 3,882,946 A * | 5/1975 | Ioannesian et al. | 175/107 |
| 3,938,596 A * | 2/1976 | Ivanov et al. | 173/73 |
| 5,112,188 A * | 5/1992 | Barnetche-Gonzalez | 415/198.1 |
| 5,517,464 A * | 5/1996 | Lerner et al. | 367/84 |
| 5,586,083 A * | 12/1996 | Chin et al. | 367/84 |
| 5,924,534 A | 7/1999 | Okubo | |
| 6,555,926 B2 * | 4/2003 | Gondron | 290/1 R |

\* cited by examiner

HYDRAULIC BRAKING DEVICE FOR TURBINE, TURBINE EQUIPPED WITH SUCH A DEVICE AND DRILLING EQUIPMENT COMPRISING SUCH A TURBINE

TECHNICAL FIELD

This invention relates to a hydraulic braking device for a turbine, designed to reduce the turbine rotation speed in the case of an overspeed in order to prevent damage to the machine on which the said turbine is fitted. It also relates to a turbine equipped with such a hydraulic braking device. It also relates to drilling equipment provided with a turbine equipped with such a hydraulic braking device.

STATE OF PRIOR ART

A braking device for a turbine used on a drilling tool is already known. Document U.S. Pat. No. 5,517,464 describes an instrument for making measurements during drilling designed to measure a number of drilling parameters at the drilling head and to transmit them to the surface, in the form of acoustic signals modulated through the drilling fluid. A generating turbine supplies the power necessary for the detection of parameters and transmission of signals. The generating turbine comprises a rotor rotation speed regulation device that uses an electromagnetic circuit. This electromagnetic regulating device has the disadvantage that it is complex and that it generates heat that must be dissipated. The braking moment increases linearly with the rotation speed. This linear rotation induces a serious disadvantage, since a fairly pronounced and undesirable braking effect can occur, even at rotation speeds located within a speed range corresponding to normal operation of the turbine.

Document U.S. Pat. No. 6,155,328 describes another hydraulic braking device associated with a blind winding and unwinding mechanism. The blind spindle is connected to a hydraulic brake located inside a compartment containing a viscous fluid. The friction caused by rotation of the brake within the viscous fluid reduces the blind rotation speed. This brake generates a resisting torque that excessively slows down the winding and unwinding mechanism at moderate speeds.

PRESENTATION OF THE INVENTION

According to a first aspect of the invention, a hydraulic braking device is proposed for a turbine in equipment, for example such as drilling equipment, which will reduce the turbine rotation speed to prevent an overspeed from occurring.

The hydraulic braking device for a turbine, the said turbine being provided with a turbine shaft, comprises at least one body connected to the said turbine shaft. When the said hydraulic braking device is immersed in a fluid medium, rotation of the turbine shaft about its axis causes a movement of the said at least one body with respect to the said fluid medium. This movement generates a resisting torque related to the rotation speed of the turbine shaft through a non-linear relation.

In general, this non-linear relation is a quadratic relation, in which the resisting torque is a function of the square of the rotation speed of the turbine shaft with respect to the said fluid medium.

In one embodiment, a braking shaft is coupled to the said turbine shaft. This coupling between the turbine shaft and the braking shaft includes a configuration in which the two shafts are combined into a single shaft, and a configuration in which the two shafts are coupled through a coupling device.

During use, the braking device is immersed in a fluid medium, which may be either stagnant or flowing, for example in a pipe. When the turbine shaft rotates about its axis, it starts to rotate the braking shaft that may either be coincident with the turbine shaft or distinct from the turbine shaft, about its axis, relative to the said fluid medium. The braking shaft transmits energy from the turbine to the at least one body mentioned above, that causes the desired braking.

The braking device according to the invention may be used on an "axial" type turbine, or an "axial inlet and radial outlet" type turbine, or a "radial inlet and axial outlet" type turbine. It may be located on the upstream or downstream side of the turbine. When it is placed on the downstream side of the turbine, its presence does not disturb the flow entering into the turbine.

The construction of the device is such that a braking effect is obtained in the case of a turbine overspeed, in other words when the turbine rotation speed exceeds a predetermined threshold value. Therefore, the braking device according to the invention makes it possible to regulate the turbine speed.

There are several advantages of the braking effect produced by the hydraulic braking device according to the invention.

Preventing a turbine overspeed avoids damage to elements from which the turbine is made caused by this excessive rotation speed. Subsequently, if the turbine is connected to an electricity generator, excessive energy production can also be avoided.

Preventing a turbine overspeed can prevent damage to elements forming part of the equipment on which the turbine is installed. The said damage could be a direct result of the excessive turbine rotation speed, or it could be an indirect result of a sudden projection of an element forming part of the turbine into its immediate environment.

According to a second aspect of the invention, a turbine equipped with a hydraulic braking device conform with the first aspect of the invention is proposed.

According to a third aspect of the invention, drilling equipment is proposed comprising a turbine equipped with a hydraulic braking device conform with the first aspect of the invention.

BRIEF DESCRIPTION OF THE DRAWINGS

Other characteristics and advantages of the invention will become clearer after reading the detailed description of the invention which will be presented through embodiments of the invention provided for illustrative purposes, but in no way limitative, with reference to the attached drawings in which.

DETAILED PRESENTATION OF THE INVENTION

Figure 1:
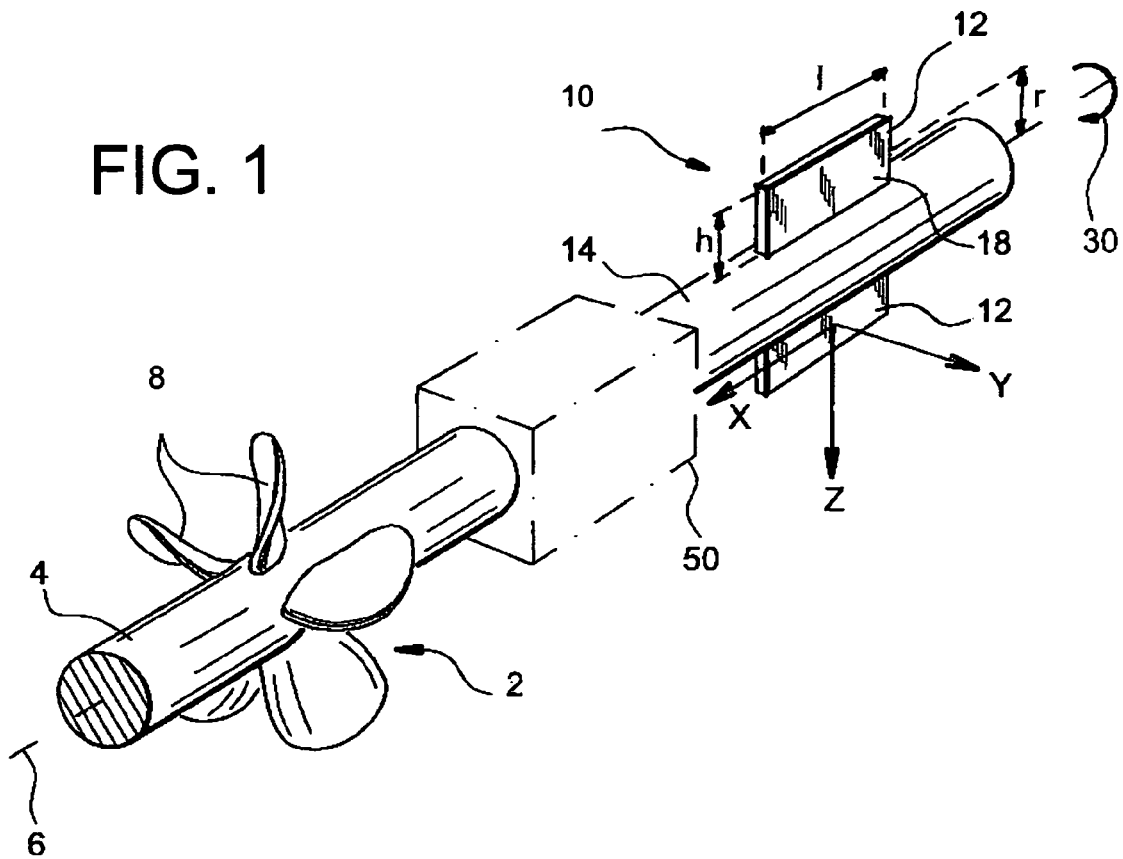
FIG. 1 shows a perspective view of a first embodiment of the turbine hydraulic braking device.

We have seen above that:
the hydraulic braking device for a turbine including a turbine shaft comprises at least one body connected to the said turbine shaft, when the said hydraulic braking device is immersed in a fluid medium, rotation of the turbine shaft about its axis causes a movement of the said at least one body with respect to the said fluid medium, this movement generates a resisting torque that is related to the rotation speed of the turbine shaft through a non-linear rotation, in general, this non-linear relation is a quadratic relation in which the resisting torque is a function of the square of the rotation speed of the turbine shaft with respect to the said fluid medium.

We will firstly describe the non-linear relation between the resisting torque and the rotation speed of the bodies of the hydraulic braking device, this relation being obtained by use of one of Newton's laws. During rotation of the turbine, in other words when the turbine shaft is rotating about its axis, the resisting torque exerted by each of the bodies on the fluid medium with respect to the rotation axis of the braking shaft is expressed as follows:

$$T = C_D.A.\rho.r^3.(\omega_b - \omega_f)^2,$$

where:

$C_D$ is the drag coefficient of the body along a tangential direction,

A is the projected area of the body along a tangential direction, $\rho$ is the density of the fluid medium, r is the effective radius of the body, in other words the distance between the rotation axis of the braking shaft and the pressure center of the body, the said pressure center being the location at which the resultant pressure exerted by the fluid medium on the body is applied, $\omega_b$ is the body rotation speed, $\omega_f$ is the rotation speed of the fluid medium defined by $\omega_f = U_f/r$, where $U_f$ is the average tangential flow speed of the fluid medium.

This resisting torque T increases when (1) the drag coefficient $C_D$ of the body increases; (2) the effective radius r increases; (3) the square of the rotation speed of the body with respect to the fluid medium $(\omega_b - \omega_f)$ increases.

In one embodiment, the rotation speed $\omega_D$ of the body is proportional to the rotation speed $\omega_b$ of the turbine. This proportionality is expressed by the relation $\omega_b = k.\omega_t$, where k is a proportionality factor. Consequently, as long as the rotation speed $\omega_t$ of the turbine remains less than a given speed threshold, the braking effect cannot be felt significantly, as a result of the quadratic relation. On the other hand, when the rotation speed $\omega_t$ of the turbine exceeds this speed threshold, the difference $(\omega_b - \omega_f)$ between the rotation speed of the body and the rotation speed of the fluid medium increases. The resisting torque T increases with the square of this difference in the rotation speeds. The braking effect is then felt significantly.

It can also be understood that when several bodies are present, their resisting torques T are additive, and the braking effect is increased. The value of the speed threshold may be chosen as a function of the required application, and the braking device may be configured as a function of the required speed threshold.

The shapes and dimensions of the bodies and the number of bodies are chosen such that a sufficient space is formed around each body so as to minimize the rotation speed $\omega_f$ of the fluid medium. In an extreme case in which the fluid medium is driven in rotation by action of the bodies, the difference in speeds $(\omega_b - \omega_f)$ would be almost zero and consequently the braking effect will be almost non-existent.

In one embodiment, the braking device comprises a braking shaft coupled to the turbine shaft.

The shapes and dimensions of the bodies, and the layout of the bodies with respect to the braking shaft, are chosen so as to increase the value of the drag coefficient $C_D$ and/or the value of the effective radius r.

The choice of one or more of these parameters can affect the other parameters. For example, if the number of bodies is increased, the total resisting torque T is increased. But in this case, the available space around each body is reduced, which increases the value of the rotation speed $\omega_f$ of the fluid medium and consequently this tends to reduce the resisting torque T. Therefore, the number of bodies is chosen taking account of the dimensions of the bodies and the diameter of the braking shaft.

Similarly, if the dimensions of the bodies are increased, the projected area of the body A is increased which tends to increase the resisting torque T. But in this case, the available space around each body is reduced, which increases the value of the rotation speed $\omega_f$ of the fluid medium and consequently tends to reduce the resisting torque T.

One way of increasing the effective radius r of a body without oversizing it consists of modifying the connection between the braking shaft and the said body.

Thus, in one variant embodiment, the body is fixed directly onto the braking shaft through at least one connecting means composed of a body anchor zone. According to another variant embodiment, the body is connected to the braking shaft through at least one connecting means composed of an additional support. When the said at least one connecting means has a streamlined profile, the fluid medium can flow around the braking shaft along its direction of flow, without being driven in rotation in an exaggerated manner. Subsequently, the effective radius r can be significantly increased without significantly increasing the rotation speed $\omega_f$ of the fluid medium.

The bodies may be profiled bodies or non-profiled bodies. One advantage of non-profiled bodies is that they increase the drag coefficient $C_D$ and consequently the resisting torque T without it being necessary to oversize the bodies.

Figure 2:
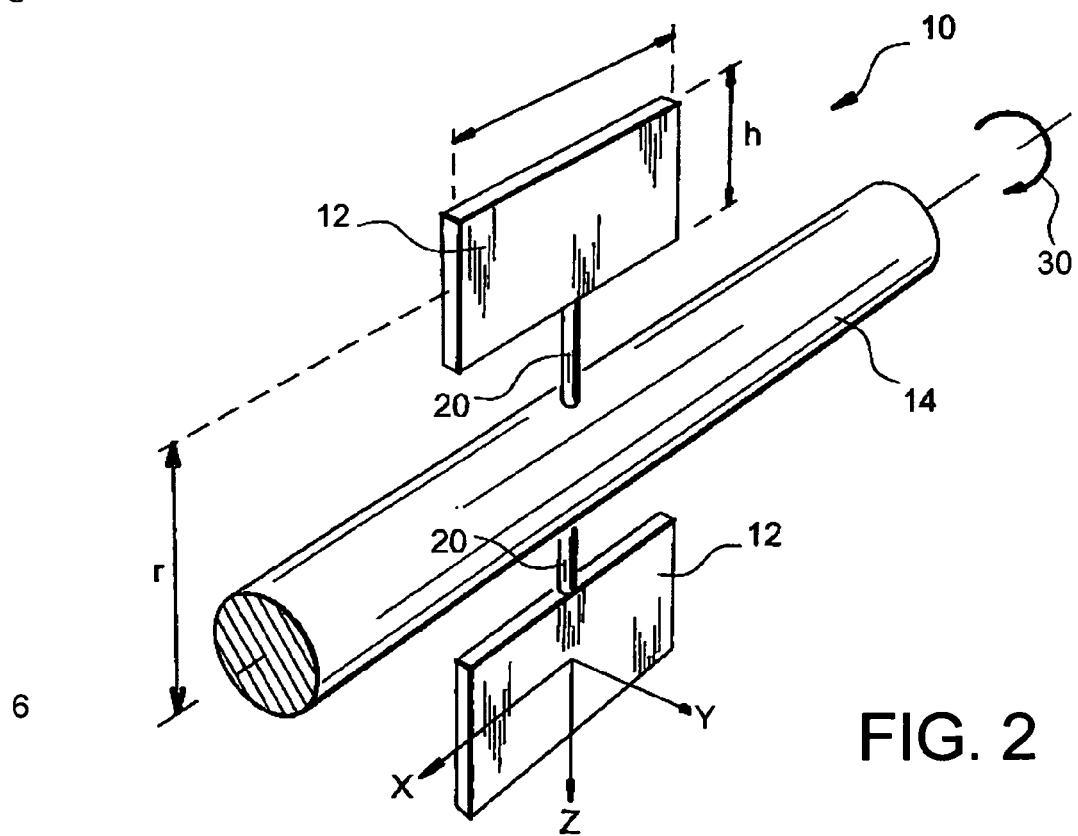
FIG. 2 shows a perspective view of a second embodiment of the turbine hydraulic braking device.

We will now describe particular embodiments of hydraulic braking devices according to the invention with reference to FIGS. 1 and 2.

With reference firstly to the left part of FIG. 1, an "axial" type of turbine 2 is shown, comprising a turbine shaft 4 capable of rotating about its axis 6 and provided with vanes 8, of which there are five in the example shown.

Now with reference to the right part of FIG. 1, a first particular embodiment of the braking device 10 is shown. The said braking device 10 comprises a braking shaft 14 coaxial with the turbine shaft 4 that is free to rotate about their common axis 6. Rotation of the shaft 14 about the axis 6 is materialized by the arrow 13. The said braking device 10 also comprises bodies 12 fixed directly onto the braking shaft 14 through an anchor zone 18. These bodies extend radially from the braking shaft 14. In the example illustrated, there are two of the said bodies 12 and they are identical. They are positioned diametrically opposite each other on opposite sides of the braking shaft 14. Each is approximately in the shape of a parallelepiped plate facing a direction parallel to the axial direction of the braking shaft 14.

In order to facilitate understanding, a local coordinate system (X, Y, Z) is associated with each body 12. It comprises two axes X and Y contained in the plane of the plate 12 and perpendicular to each other, the X axis being parallel to the rotation axis 6 and the Z axis being oriented radially outwards. A Y axis completes these axes such that the coordinate system (X, Y, Z) is a direct orthogonal coordinate system.

The length l of the plates 12 is in the X direction, their width h is along the Z direction, and the average effective radius r is along the Z direction. For the plates 12, the area A projected along a tangential direction is equal to A=l.h, the tangential direction being the Y direction.

Now with reference to FIG. 2, a second particular embodiment of the braking device 10 is shown. It is different from the first embodiment that was described with reference to FIG. 1 by the fact that each body 12 is connected to the braking shaft 14 through a connecting means 20 that moves the body 12 away from the braking shaft 14, rather than being fixed to it directly. In the example shown, the said connecting means 20 is in the form of a rigid arm 20 rigidly connected both to the braking shaft 14 and to the body 12. It is arranged radially, in other words along the normal to the peripheral surface of the braking shaft 14, and is centered with respect to the dimension of the body 12 along the X direction.

One variant embodiment of the first embodiment or the second embodiment of 15 the braking device 10 is illustrated in FIG. 1. According to this variant, the braking device 10 also comprises a coupling device 50 to couple the braking shaft 14 with the turbine shaft 4. This coupling device 50, shown as a chain dotted line in FIG. 1, may for example be a gearbox, or a clutch.

In the presence of a coupling device 50, rotation of the braking shaft 14, in other words the rotation speed $\omega_b$ of the bodies 12 about the axis 6, is proportional to the rotation speed $\omega_t$ of the turbine shaft 4 about the axis 6, in other words the rotation speed of the turbine 2. The proportionality factor k between the rotation speed of the turbine 2 and the rotation speed of the bodies 12 is defined by the characteristics of the coupling device 50.

On the other hand, if there is no coupling device 50, the two shafts 4 and 14 are coincident and rotate at the same speed about the axis 6.

The turbine braking device 10 is not limited to the examples that have just been described.

A braking device 10 could be considered with a braking shaft 14 parallel to the turbine shaft 4 without being coaxial with it. In this case, the coupling device is adapted accordingly to transmit the rotation movement from the turbine shaft 4 to the braking shaft 14.

It would be possible to consider a braking device with a number of bodies not equal to two. For example, it would be possible to consider a braking device comprising a single body. A configuration with several bodies, in other words at least two, for example three or four or more bodies, would be better than a configuration with a single body, if there are any vibrations.

Bodies 12 could be considered in the form of plates that are not parallelepiped shaped, for example polygonal, circular or elliptical plates, etc.

It would be possible to consider bodies 12 in the form of plates oriented such that their plane is not parallel to the axial direction of the braking shaft.

It would be possible to consider bodies 12 in a form other than a plate. In the case of a braking device 10 that will be installed on an "axial" type turbine, it would be possible to consider bodies 12 with an increased surface area facing the flow direction of the fluid medium. One possible example is the example of a cup-shaped body 12 or with a "V" profile, which would be arranged such that the concave side of each body is oriented to face the flow direction of the fluid medium.

One possible example is the example of a body 12 with a shape approximately the same as the shape of the vanes of a Pelton type turbine.

It would be possible to consider bodies 12 with different shapes. It would be possible to consider bodies 12 that do not all have the same dimensions.

It would be possible to consider a non-symmetrical distribution of the bodies 12 around the braking shaft 14.

It would be possible to consider an arrangement of bodies with respect to the braking shaft in which the bodies are not all in the same axial position with respect to the braking shaft.

It can be understood that the use of this type of arrangement of the braking device and/or combinations between different arrangements can increase the drag coefficient $C_D$ and/or increase the effective radius r and/or reduce the fluid rotation speed $\omega_f$, in order to increase the value of the resisting torque T.

The invention also relates to a turbine 2 equipped with a hydraulic braking device 10 according to the invention.

In one particular embodiment, the turbine 2 and the braking device 10 are immersed in the same fluid medium.

In another particular embodiment, the turbine 2 is immersed in a first fluid medium contained in a first containment, and the braking device 10 is immersed in a second fluid medium contained in a second containment. The two fluid media can then be chosen to be identical or different.

This turbine may be installed in drilling equipment or a drilling installation.

Figure 3:
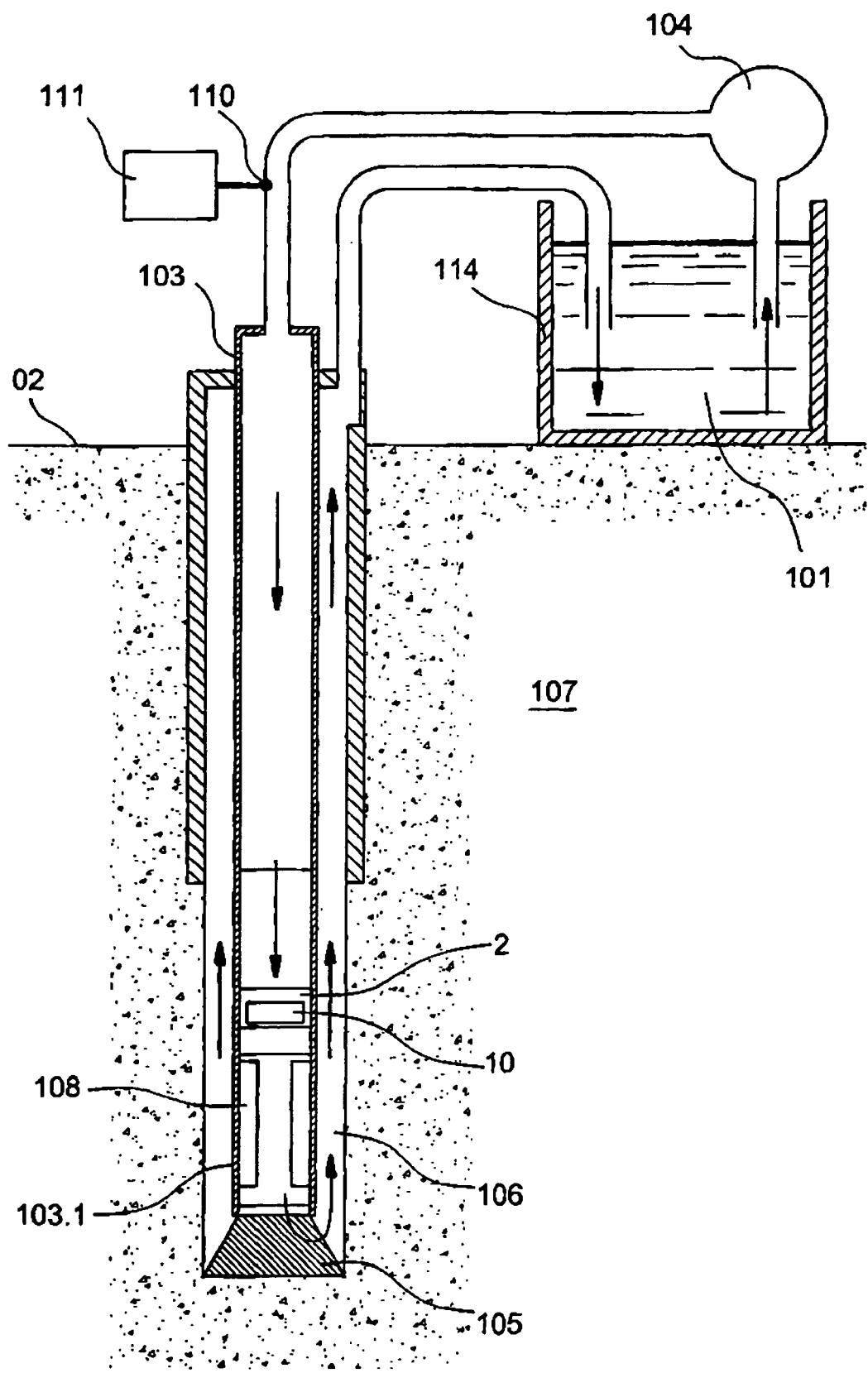
FIG. 3 shows a drilling installation that uses drilling equipment comprising a turbine equipped with a hydraulic braking device according to the invention.

FIG. 3 illustrates the general layout of a drilling installation, which comprises a turbine 2 fitted with a hydraulic braking device 10 according to the invention. A drilling fluid 101 contained in a reservoir 114 is injected using a pump 104 from the surface 102, inside a string of drilling rods 103 that will be used for drilling in a geological formation 107. The drilling fluid 101 reaches a drilling tool 105 that terminates the string of drilling rods 103. The drilling fluid 101 comes out of the rods string 103 and returns to the surface 102 through the space 106 between the rods string 103 and the geological formation 107. The path followed by the drilling fluid 101 is illustrated by arrows.

One of the rods 103.1 in the string of drilling rods 103 located close to the drilling tool 105 is instrumented. This rod contains at least one measurement device 108. When it is intended to evaluate the physical properties of the geological formation 107, such as its density, porosity, resistivity, etc., this measurement device 108 is known as a "logging while drilling" (LWD) tool. When it is intended to measure drilling parameters such as the temperature, pressure, orientation of the drilling tool, etc., this measurement device 108 is known as a "Measuring While Drilling" (MWD) tool.

The instrumented rod 103.1 is usually a drill collar. This instrumented rod 103.1 usually comprises a turbine 2, itself equipped with a hydraulic braking device 10 according to the invention.

In a manner known in itself, a flow straightening device may be provided on the upstream side or downstream side of the braking device 10, preferably between the turbine 2 and the braking device 10. The role of this flow straightening device is to reduce rotation of the fluid medium due to rotation of the turbine 2.

If the assembly consisting of the turbine 2 and the braking device 10 is installed in a pipe, the fluid straightening device may for example be formed of complementary bodies fixed to the wall of the pipe.

If this assembly is placed in a fluid medium without being close to any pipe, the flow straightening device may for example be formed of counter-vanes located close to the braking device 10.

The invention claimed is:

1. A drilling apparatus comprising:
   a turbine provided with a turbine shaft,
   a hydraulic braking device configured to operate with the turbine,
   wherein the hydraulic braking device consists of a braking shaft coupled to the turbine shaft and bodies rotatably connected to the braking shaft, and
   wherein when the hydraulic braking device is immersed in a drilling fluid, an axial rotation of the turbine shaft causes an axial rotation of the braking shaft which in turn causes a movement of the bodies with respect to the drilling fluid, this movement generating a resisting torque that is a function of the square of the rotation speed of the turbine shaft with respect to the drilling fluid providing a quadratic relation, and
   wherein the construction of the hydraulic braking device is such that a braking effect is obtained when the rotation speed of the turbine shaft exceeds a predetermined threshold value and the braking effect is not obtained when under the predetermined value as a result of the quadratic relation.

2. The drilling apparatus according to claim 1, wherein the braking shaft is coaxial with the turbine shaft.

3. The drilling apparatus according to claim 1, wherein the braking shaft and the turbine shaft are combined into a single shaft.

4. The drilling apparatus according to claim 1, wherein the bodies are rigidly connected to the braking shaft through a connecting means.

5. The drilling apparatus according to claim 1, wherein the bodies are fixed directly onto the braking shaft through a connecting means composed of at least one anchor zone of the bodies.

6. The drilling apparatus according to claim 1, wherein the bodies are distributed around the periphery of the braking shaft, in a regular manner, or in a non-regular manner.

7. The drilling apparatus according to claim 1, wherein the bodies have either all the same axial positions along the braking shaft, or different axial positions along the braking shaft.

8. The drilling apparatus according to claim 1, wherein the bodies are chosen to be identical or different.

9. The drilling apparatus according to claim 1, wherein the bodies all have the same dimensions.

10. The drilling apparatus according to claim 1, wherein the hydraulic braking device is arranged on the downstream side of the turbine with respect to a flow direction of the drilling fluid.

11. The drilling apparatus according to claim 1, wherein the bodies extend along a length of the braking shaft.

12. The drilling apparatus according to claim 1, wherein the bodies extend in a substantially normal direction from the braking shaft.

13. The drilling apparatus according to claim 1, wherein a flow of the drilling fluid drives the turbine.

14. The drilling apparatus according to claim 13, wherein the flow is parallel to a central axis of the braking shaft and to a length of the bodies.

15. The drilling apparatus according to claim 1, wherein the turbine shaft and the braking shaft are coupled by a coupling device so that the rotation speed of the braking shaft is proportional to but different from the rotation speed of the turbine shaft.

16. The drilling apparatus according to claim 1, wherein the bodies comprise at least one cup-shaped or V-shaped body that is arranged such that the concave side of the at least one cup-shaped or V-shaped body is oriented to face a flow direction of the drilling fluid.

* * * * *